(12) United States Patent
Merkel et al.

(10) Patent No.: US 6,461,658 B1
(45) Date of Patent: Oct. 8, 2002

(54) METHOD OF IMPROVING SWEETNESS DELIVERY OF SUCRALOSE

(75) Inventors: Carolyn M. Merkel, North Haledon, NJ (US); Michael G. Lindley, Crowthorne (GB)

(73) Assignee: McNeil-PPC, Inc., Skillman, NJ (US)

(*) Notice: Subject to any disclaimer, the term of this patent is extended or adjusted under 35 U.S.C. 154(b) by 0 days.

(21) Appl. No.: 09/333,644

(22) Filed: Jun. 15, 1999

Related U.S. Application Data

(60) Provisional application No. 60/091,888, filed on Jul. 7, 1998.

(51) Int. Cl.[7] .................. A23L 1/236; A23L 2/00; A23G 3/00; A61K 47/00; A61K 31/19

(52) U.S. Cl. ............... 426/548; 426/590; 426/658; 424/439; 514/568

(58) Field of Search .................. 426/548, 590, 426/658; 424/439; 514/568

(56) References Cited

U.S. PATENT DOCUMENTS

| | | | |
|---|---|---|---|
| 4,405,654 A | | 9/1983 | Lee |
| 4,820,528 A | | 4/1989 | Stroz et al. |
| 5,013,716 A | | 5/1991 | Cherukuri et al. |
| 5,409,907 A | * | 4/1995 | Blase .................. 514/54 |
| 5,637,618 A | | 6/1997 | Kurtz et al. |
| 5,902,628 A | * | 5/1999 | Shamil .................. 426/590 |

FOREIGN PATENT DOCUMENTS

| | | | | |
|---|---|---|---|---|
| CA | 1 208 966 | 8/1986 | ........... A23L/1/236 |
| EP | 0103479 B1 | 3/1984 | |
| EP | 0425115 A1 | 5/1991 | |
| WO | WO 93/10677 | 6/1993 | ............. A23L/1/22 |
| WO | WO 98/20753 A1 | 5/1998 | |
| WO | WO 99/15032 | 4/1999 | ........... A23L/1/236 |

OTHER PUBLICATIONS

CA Abstract, AN: 1996:296437, Koiso et al. 1996.*
Tunaley, A., "Perceptual Characteristics of Sweeteners", Progress in Sweeteners, T.H. Grenby, Ed. Elsevier Applied Science, 1989.
S.G. Wiet and G.A. Miller, Food Chemistry, 58(4):305–311 (1997).
S.G. Wiet, et al., J. Food Sci., 58(3):599–602, 666 (1993).
C.-K. Lee, Advances in Carbohydrate Chemistry and Biochemistry, 45:199–351 (1987).
Fukotomi, Fumitake, Abstract of "sucralose–An Intensive Sweetener", Foods Food Ingredients, pp. 22–26, 1998, Coca–Cola (Japan) Co., Ltd., Tokyo, Japan.
Koiso, Hiroaki et al., et al., "Sensory Characteristics of Sucralose and Comparison With Other High–Intensity Sweeteners", Nippon Shokuhin Kagaku Gakkaishi, pp. 110–114, 1996, San–Ei Gen F.F.I., Inc., Toyonaka, Japan.
Hanger, L.. Y. et al., "Descriptive Profiles of Selected High–Intensity Sweeteners (HIS), HIS Blends, & Sucrose", J. Food Science, pp. 456–458, 464, 1996, Hoechst Food Ingredients, New Jersey USA.
Schiffman, Susan S. et al., "Bitterness of Sweeteners As A Function of Concentration", Brain Res. Bull, pp. 505–513, 1995, Duke University, North Carolina, USA.
Meyer, Christophe et al., "Conformation Analysis of 4, 1', 6'–Tricholor–4,1', 2'–Trideoxy–Galacto–Sucrose (Sucralose) By A Combined Moecular–Moldeling and NMR Spectroscopy Approach", J. Am. Chem. Soc. 115, pp. 10300–10310, 1993, Inst. Natl. Rech. Agron, France.

(List continued on next page.)

Primary Examiner—Russell Travers
Assistant Examiner—Shengjun Wang

(57) ABSTRACT

This invention provides a method of improving the sweetness delivery profile of a sucralose-containing ingestible composition, which comprises incorporating therein DHB at a DHB:sucralose weight ratio of from about 0.01% to about 100%.

9 Claims, 2 Drawing Sheets

OTHER PUBLICATIONS

Ketelsen, S.M. et al., "Time–Intensity Parameters of Selected Carbohydrate and High Potency Sweeteners", *J. Food Science* 58, pp. 1418–1421, 1993, McNeil Spec. Prod. Co., New Jersey, USA.

Wiet, Stephan G. et al., "Sensory Characteristics of Sucralose and Other High Intensity Sweeteners", *J. Food Science* 57, pp. 1014–1019, 1992, McNeil Spec. Prod. Co. New Jersey, USA.

Williams, L.A. "Seeking Sweet Solutions", *World of Ingredients* (May–Jun.), pp. 35–38, 1999.

"Sweetening Compsns. Contg. Chlorinated Saccharose Derivs.—As Powerful As Saccharin WithoutBitter Aftertaste", Tate & Lyle Ltd, 1977 (BE 850,180).

"Composite Sweetener With No Bitter After–Taste—Contains Fructo—Oligosaccharide and Aspertem For Enhanced Sweetness", Meiji Seika Kaisha,, 1985 (JP 60,149,358).

Hough, L. et al., "Enhancement in the Sweetness of Sucrose", *Nature* 263, pp. 800, 1976, Queen Elizabeth College, London, England.

* cited by examiner

METHOD OF IMPROVING SWEETNESS DELIVERY OF SUCRALOSE this application claims priority of U.S. provisional application No. 60/091,888 filed Jul. 7, 1999.

FILED OF THE INVENTION

This invention relates to the use of 2,4-dihydroxybenzoic acid as a means of improving the sweetness delivery profile of the sweetener sucralose.

BACKGROUND OF THE INVENTION

Sweeteners are known to impart a number of characteristics to food including, without limitation, odor, flavor, mouthfeel, and aftertaste. These properties, particularly flavor and aftertaste, are well known to vary over the time of tasting, such that each temporal profile is sweetener-specific (Tunaley, A., "Perceptual Characteristics of Sweeteners", Progress in Sweeteners, T. H. Grenby, Ed. Elsevier Applied Science, 1989)).

"Tastands" are eatable compounds that reduce or eliminate undesirable tastes in other eatables, and do so at concentrations below those at which their own tastes are perceptable. Known tastands, including 2,4-dihydroxybenzoic acid, have been claimed to reduce or eliminate undesirable aftertastes, particularly bitter and/or metallic, in eatables containing high-intensity sweeteners. (Kurtz, et al., U.S. Pat. No. 5,637,618.) For the sake of convenience, the term "DHB" is used herein, where appropriate, to mean 2,4-dihydroxybenzoic acid and comestible salts thereof.

Tastands have been claimed to reduce or eliminate undesirable tastes by essentially blocking the undesirable taste interaction with the receptor site on the taste bud, without the tastand's imparting a taste of its own. This mechanism has been analogized to competitive inhibition with the binding site of the receptor(s) and/or competitive inhibition with the site(s) that influences the receptor. The tastand has been described as directly interacting with the receptor site for the undesirable taste, thereby preventing interaction of the undesirable taste with the target receptor site.

Sweeteners such as saccharin and 6-methyl-1,2,3-oxathiazin-4(3H)-one-2,2-dioxide potassium salt (acesulfame potassium) are commonly characterized as having bitter and/or metallic aftertastes. Products prepared with 2,4-dihydroxybenzoic acid along with these sweeteners are claimed to display reduced undesirable aftertastes. In contrast, some high-intensity sweeteners, notably sucralose (1,6-dichloro-1,6-dideoxy-β-D-fructofuranosyl-4-chloro-4-deoxy-α-D-galacto-pyranoside) and aspartame (N-L-α-aspartyl-L-phenylalanine methyl ester), display clean sweet tastes very similar to that of sugar (S. G. Wiet and G. A. Miller, Food Chemistry, 58(4):305–311 (1997)). In other words, these compounds are not characterized as having bitter or metallic aftertastes.

Still, high intensity sweeteners such as sucralose and aspartame are reported to have sweetness delivery problems, i.e., delayed onset and lingering of sweetness (S. G. Wiet, et al., J. Food Sci., 58(3):599–602, 666 (1993)). These phenomena arise via mechanisms which are biochemically distinct from those responsible for generating bitter or metallic aftertastes in response to certain other sweeteners (C. K. Lee, Advances in Carbohydrate Chemistry and Biochemistry, 45:199–351 (1987)).

SUMMARY OF THE INVENTION

This invention provides a method of improving the sweetness delivery profile of a sucralose-containing ingestible composition, which comprises incorporating therein DHB at a DHB:sucralose weight ratio of from about 0.01% to about 100%.

DETAILED DESCRIPTION OF THE INVENTION

Figure 1:
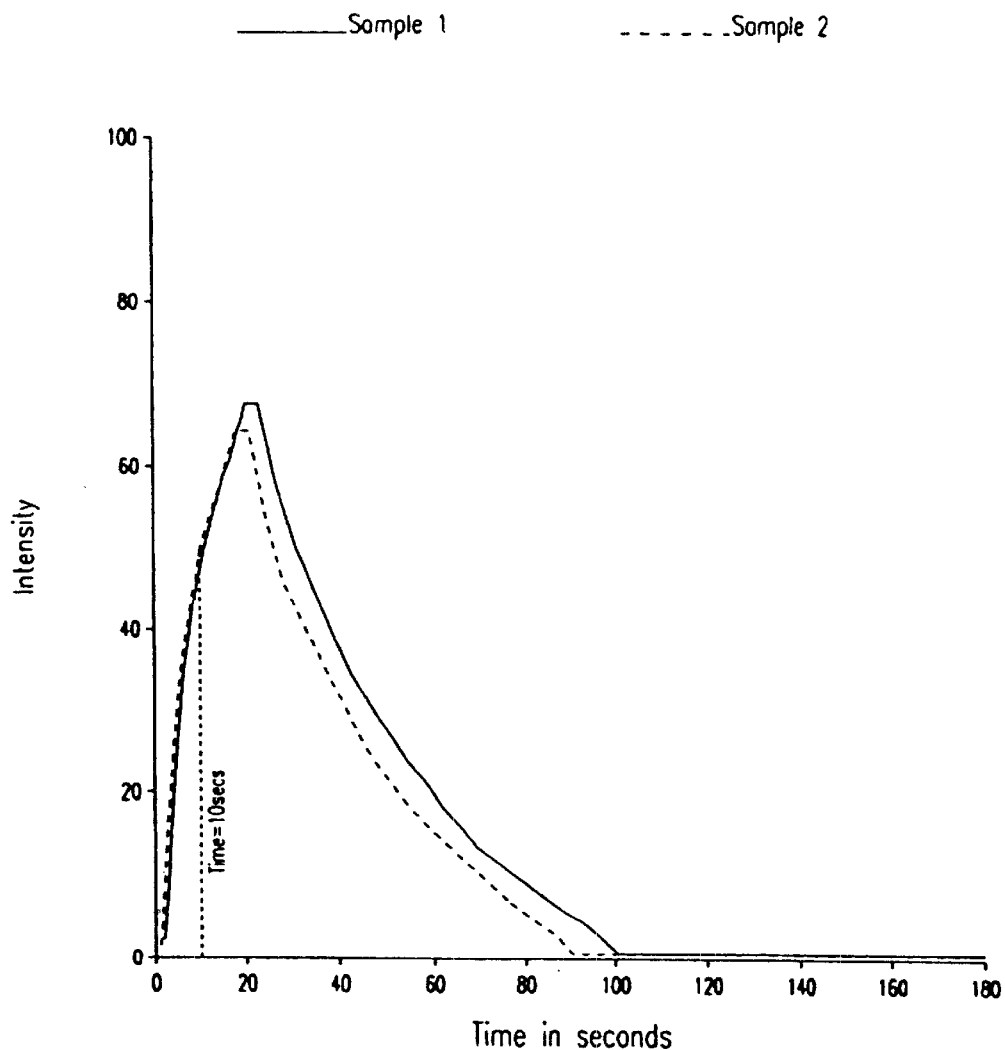
FIG. 1 shows the time-intensity curves for solutions of sucralose alone (Sample 1) and sucralose with added 2,4-dihydroxybenzoic acid (Sample 2). The data in Table 1 ("STIME") in the Examples below correlate with the curves shown in this Figure. The curve parameters, as shown in the Table, are defined as follows. $I_{max}$: maximum intensity recorded. $T_{max}$: first time that maximum intensity was recorded. $T_{end}$: last time that a non-zero intensity was recorded. $T_{dec50}$: last time that an intensity greater than 50% of $I_{max}$ was recorded (i.e. the time at which the intensity had decreased to 50% of $I_{max}$). $T_{dec10}$: same as for $T_{dec50}$, but at 10% of $I_{max}$. Area: area under the curve. $T_{decline}$: time interval from $T_{max}$ to $T_{dec10}$. The experiments giving rise to the data in this Figure and Table 1 are described in Example 1 below.

It was discovered in this invention that 2,4-dihydroxybenzoic acid alters the rate at which sucralose interacts with "desirable" sweet taste receptor sites (i.e. sites transmitting the perception of sweetness). This finding is surprising, since the rate at which a sweet molecule binds to such desirable sites would not be expected to be altered by the presence of a tastand known to interact with an "undesirable" taste receptor site.

More specifically, since sucralose lacks any significant aftertaste, 2,4-dihydroxybenzoic acid would not have been expected to affect the perception of its sweetness. It was found, however, that 2,4-dihydroxybenzoic acid significantly reduces the length of time during which sucralose sweetness is perceived. It was also found that 2,4-dihydroxybenzoic acid does not alter the sweetness delivery profile of aspartame, even though aspartame and sucralose share properties such as an absence of bitter and metallic aftertastes (see Examples below).

Accordingly, this invention provides a method of improving the sweetness delivery profile of a sucralose-containing ingestible composition, which comprises incorporating therein DHB at a DHB:sucralose weight ratio of from about 0.01% to about 100%. As used herein, "sucralose" shall mean 1,6-dichloro-1,6-dideoxy-β-D-fructofuranosyl-4-chloro-4-deoxy-α-D-galactopyranoside. DHB, defined above to mean 2,4-dihydroxybenzoic acid and comestible salts thereof, is recognized by the Flavor and Extract Manufacturer's Association as safe for consumption. Comestible grade DHB is available, for example, from Aldrich Chemical Co. (Milwaukee, Wis.). Comestible salts of 2,4-dihydroxybenzoic acid are preferred for use in this invention.

The "sweetness delivery profile" of sucralose, and therefore a sucralose-containing composition, includes both the time period preceding sweetness onset ("onset period"), and the time period during which sweetness lingers ("lingering period"). Reduction in length of either period improves the sweetness delivery profile of a sucralose-containing composition. Thus, in one embodiment of the invention, the improvement comprises reducing the onset period. In another embodiment, the improvement comprises reducing the lingering period. In the preferred embodiment, the improvement comprises reducing both the onset period and the lingering period.

DHB-induced shortening of sweetness onset and lingering periods is measured using an aqueous solution containing only sucralose. This solution constitutes a simple taste system, in that it triggers only sweetness receptors. In more complex sucralose-containing taste systems (e.g., an apple bar) that additionally trigger bitterness, sourness and/or salty receptors, DHB still reduces sweetness onset and lingering periods. However, in such complex systems, this DHB-induced reduction may not be perceived as such. Rather, as shown in the Examples below, this reduction may be perceived quite generally as an increase in overall "liking" of the sucralose-containing composition.

The ingestible composition whose sweetness delivery profile is improved can contain any sweetening amount of sucralose. Typically, this amount ranges from about 0.002% to about 10% by total weight of the ingestible composition. However, this amount can vary greatly depending on the nature of the composition being sweetened.

The amount of DHB added to the ingestible composition can be measured in relation to the amount of sucralose present in the composition. In one embodiment, the DHB:sucralose weight ratio is from about 0.1% to about 50%. In the preferred embodiment, the DHB:sucralose weight ratio is from about 2% to about 10%.

The DHB:sucralose ratio ranges in this invention were determined based on the preferred levels of DHB, and the sucralose levels generally used in ingestible compositions. At the lowest sucralose level (about 50 ppm) and highest DHB level (about 50 ppm) envisioned in this invention, the DHB:sucralose ratio is about 1:1, i.e. about 100%. At the highest sucralose level (as seen in sucralose concentrates and syrups), and lowest DHB level envisioned in this invention, the DHB:sucralose ratio is about 1:10,000, i.e. about 0.01%. Hence, the minimum and maximum DHB:sucralose ratios provided in this invention are about 0.01% and 100%, respectively.

"Incorporating" DHB into the sucralose-containing composition can be performed at any stage of the composition's production. In one embodiment, the incorporating occurs by combining the DHB with sucralose, and then adding the resulting mixture to other components of the composition. In another embodiment, DHB is added to other components of the composition, either before or after sucralose is added. The methods that can be used for incorporating DHB into sucralose-containing compositions are routine in the art, and are exemplified in the Examples below.

As used herein, the term "ingestible composition" means any substance intended for oral consumption either alone or together with another substance. The ingestible composition can be intended for consumption by a human, or other animal such as livestock or domestic animal.

In one embodiment, the ingestible composition is a solid or semi-solid food product. Solid and semi-solid food products include, but are in no way limited to, baked goods, confections, chewing gum, frostings, non-dairy toppings, gelatins, jams, processed fruit, ice milk, yogurt, breakfast cereals and snack foods. In another embodiment, the ingestible composition is a beverage. Beverages include, but are in no way limited to, fruit juices, soft drinks, tea, coffee, beverage mixes, milk drinks and alcoholic beverages.

In a further embodiment, the ingestible composition is a sweetener. As used herein, the term "sweetener" means a composition which is not intended for oral consumption by itself, but rather is intended for consumption together with the substance being sweetened or made sweeter. Sweeteners are typically granular in form, but can be in any other suitable form such as powder, liquid or syrup. In one embodiment, the sweetener consists essentially of sucralose. More commonly, however, the sweetener consists essentially of sucralose and a carrier such as dextrose, lactose, maltodextrin or water. One example of this is the sweetener SPLENDA®.

The embodiments of the ingestible composition can optionally contain additional agents. For example, the ingestible composition can contain carriers such as starch, lactose and sucrose itself; bulking agents such as maltodextrins; and adjuvants such as stabilizing agents, coloring agents and viscosity-adjusting agents.

Finally, the ingestible composition can be a pharmaceutical composition. Examples of pharmaceutical compositions include, by way of example, chewable tablets, elixirs and syrups.

Pharmaceutical compositions typically contain one or more pharmaceutical carriers in addition to the active ingredients. Pharmaceutically acceptable carriers are well known in the art and include, without limitation, phosphate buffers and saline solutions. Additionally, such carriers may be aqueous or non-aqueous solutions, suspensions, solids, compressed solids, and emulsions. Examples of non-aqueous solvents are propylene glycol, polyethylene glycol, vegetable oils such as olive oil, and injectable organic esters such as ethyl oleate. Aqueous carriers include, for example, water, alcoholic/aqueous solutions, emulsions and suspensions, including saline and buffered media. Solid carriers include, for example, lactose, cellulose and maltodextrins. Preservatives and other additives may also be present, such as, for example, antimicrobials, antioxidants, chelating agents, inert gases, flavoring and coloring agents and the like.

This invention will be better understood by reference to the Examples which follow, but those skilled in the art will readily appreciate that these Examples are only illustrative of the invention as described more fully in the claims which follow thereafter. Additionally, throughout this application, various publications are cited. The disclosure of these publications is hereby incorporated by reference into this application to describe more fully the state of the art to which this invention pertains.

EXAMPLE

In each of the following Examples, unless otherwise indicated, at least 55 panelists were used to evaluate the samples. Two statistical tests were used to determine if the addition of DHB significantly alters the various taste perceptions being studied. The first, analysis of variance (also known as "ANOVA"), was used here to determine whether two data sets (i.e., with and without DHB) differ at the 95% confidence level, once any variance between individual tasters is taken into account. The second, Tukey's HSD (Honestly Significant Difference) test, was also used here to determine whether data sets differ at the 95% confidence level. More specifically, Tukey's HSD test takes into account the mean square errors which have been determined by the ANOVA test. Both the ANOVA and Tukey's HSD tests are routinely used in the art.

Example 1

Sweetness Properties of Sucralose/DHB Solutions

A panel of six trained evaluators determined equally sweet levels of sucralose, sucralose+DHB, aspartame, and aspartame+DHB, all in bottled water. These equally sweet levels were found to be 200 ppm sucralose, 190 ppm sucralose+15 ppm DHB, 550 ppm aspartame, and 535 ppm aspartame+15 ppm DHB. Previous evaluations had shown 15 ppm DHB as optimal for taste alteration in sucralose products. Greater than 50 ppm DHB, in pure water solutions, has a slightly sweet taste and contributes to the total taste of the solution.

For sweetness time-intensity studies, room temperature equally sweet solutions were presented to 12 trained panelists. The panelists had been screened for general sensory acuity and trained in general methods for sweetener assessment as well as time-intensity methods. Training sessions were carried out so that all panelists were conversant with the method as well as the computerized data entry system.

For each evaluation, each panelist took 10 mls of sweetener solution in his mouth and activated the computer timing system. Using a computer mouse, the panelist rated the sweetness intensity on a line scale (ranging from "none" to "extreme") while slowly moving the sample around in his mouth. After 10 seconds, the panelist swallowed the sample and continued to rate for sweetness. Computer timing stopped after a total of 180 seconds.

In each session, panelists received two coded samples, with at least 10 minutes rest and plain cracker and water rinse between samples. Panelists rested for at least 30 minutes between sessions. No more than 3 sessions were allowed on one day. All samples were designated with a random 3-digit code, and sample presentation order was randomized and balanced across panelists.

Figure 2:
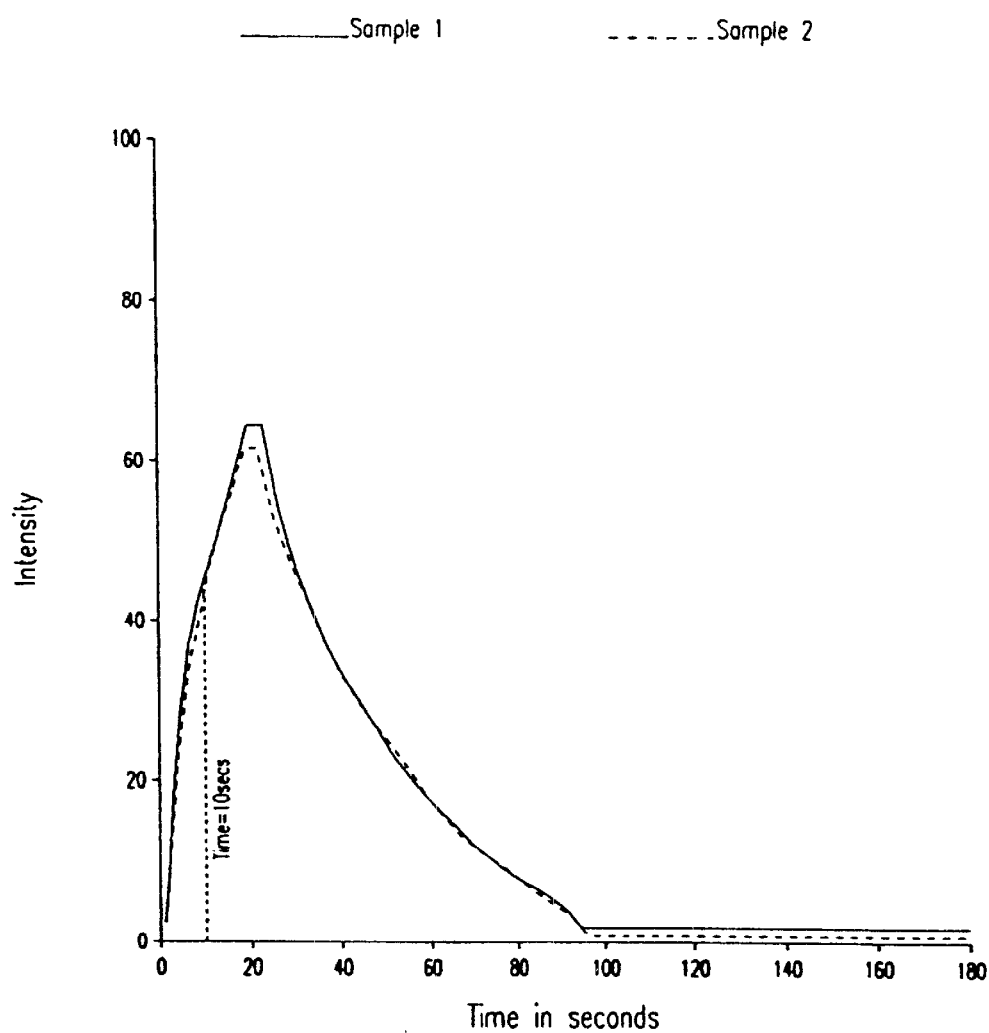
FIG. 2 shows the time-intensity curves for solutions of aspartame alone (Sample 1) and aspartame with added 2,4-dihydroxybenzoic acid added (Sample 2). The data in Table 2 ("ATIME") in the Examples below correlate with the curves shown in this Figure. These curve parameters, as shown in the Table, are defined as per those in FIG. 1. The experiments giving rise to the data in this Figure are described in Example 1 below.

The data collected by the computer were read every second, for a total of 180 data points per tasting. Mean panelist response was calculated for each time data point. Analysis of variance was carried out to determine the differences between samples. The data from these tests are shown in FIG. 1 and Table 1 (sucralose-related), and FIG. 2 and Table 2 (aspartame-related).

TABLE 1

Data Set: STIME (Sucralose)

| Parameter | Sample 1 | Sample 2 | SE of Means | 5% L.S.D. | t prob (2 - tail) |
|---|---|---|---|---|---|
| $I_{max}$ | 67.65 | 64.32 | 1.13 | 3.51 | 0.030+ |
| $T_{max}$ | 20.13 | 17.93 | 1.09 | 3.39 | 0.090x |
| $T_{end}$ | 99.68 | 89.63 | 1.74 | 5.43 | 0.001+ |
| $T_{dec50}$ | 42.67 | 38.35 | 1.87 | 5.82 | 0.066x |
| $T_{dec10}$ | 73.37 | 62.23 | 1.87 | 5.83 | 0.001+ |
| Area | 2435.53 | 2196.75 | 76.32 | 237.56 | 0.025+ |
| $T_{decline}$ | 53.23 | 44.30 | 2.23 | 6.93 | 0.008+ |

Correlation Matrix (d.f. = 117)

| | $I_{max}$ | $T_{max}$ | $T_{end}$ | $T_{dec50}$ | $T_{dec10}$ | Area | $T_{decline}$ |
|---|---|---|---|---|---|---|---|
| $I_{max}$ | 1.00 | | | | | | |
| $T_{max}$ | −0.21 | 1.00 | | | | | |
| $T_{end}$ | −0.01 | 0.09 | 1.00 | | | | |
| $T_{dec50}$ | −0.16 | 0.67 | 0.32 | 1.00 | | | |
| $T_{dec10}$ | −0.17 | 0.29 | 0.67 | 0.60 | 1.00 | | |
| Area | 0.41 | 0.23 | 0.55 | 0.52 | 0.60 | 1.00 | |
| $T_{decline}$ | −0.09 | −0.10 | 0.66 | 0.36 | 0.92 | 0.53 | 1.00 |

+ = significant at 95%
x = significant at 90%

TABLE 2

Data Set: ATIME (Aspartame)

| Parameter | Sample 1 | Sample 2 | SE of Means | 5% L.S.D. | t prob (2 - tail) |
|---|---|---|---|---|---|
| $I_{max}$ | 64.35 | 61.54 | 0.70 | 2.16 | 0.008+ |
| $T_{max}$ | 19.47 | 19.07 | 1.22 | 3.80 | 0.410 |
| $T_{end}$ | 93.61 | 95.26 | 1.81 | 5.62 | 0.265 |
| $T_{dec50}$ | 44.96 | 40.40 | 3.58 | 11.15 | 0.194 |
| $T_{dec10}$ | 74.25 | 74.08 | 3.61 | 11.24 | 0.487 |
| Area | 2428.10 | 2293.07 | 103.25 | 321.38 | 0.187 |
| $T_{decline}$ | 54.78 | 55.01 | 3.91 | 12.16 | 0.483 |

Correlation Matrix (d.f. = 141)

| | $I_{max}$ | $T_{max}$ | $T_{end}$ | $T_{dec50}$ | $T_{dec10}$ | Area | $T_{decline}$ |
|---|---|---|---|---|---|---|---|
| $I_{max}$ | 1.00 | | | | | | |
| $T_{max}$ | −0.20 | 1.00 | | | | | |
| $T_{end}$ | −0.22 | 0.20 | 1.00 | | | | |
| $T_{dec50}$ | −0.22 | 0.56 | 0.51 | 1.00 | | | |
| $T_{dec10}$ | −0.28 | 0.33 | 0.84 | 0.67 | 1.00 | | |
| Area | 0.24 | 0.38 | 0.68 | 0.75 | 0.73 | 1.00 | |
| $T_{decline}$ | −0.22 | −0.03 | 0.82 | 0.50 | 0.93 | 0.62 | 1.00 |

+ = significant at 95%

Example 2

Sweetness Properties of SPLENDA®/DHB Solutions

This Example illustrates the uniqueness of a SPLENDA®-sweetened solution with DHB in accordance with the present invention. Two solutions, equivalent in sweetness to a solution containing 10% sugar by weight, were prepared according to the formulations presented below. The maltodextrin shown in the formulations is a carrier for sucralose in the sweetener SPLENDA®, and is controlled for here by its use in both control and DHB-containing samples.

| | Maltodextrin (g) | Sucralose (g) | DHB (g) | H2O (g) |
|---|---|---|---|---|
| SPLENDA ® Control | 39.52 | 0.48 | 0.0 | 3500 |
| SPLENDA ® w/DHB sodium salt | 39.52 | 0.48 | 0.12 | 3500 |

56 panelists received a 20 ml serving of each solution. Data were analyzed using Analysis of Variance and Tukey's HSD tests. Table 3 summarizes the mean scores.

TABLE 3

| | Scale | SPLENDA ® Ctrl. | SPLENDA ® w/DHB | Signif. Diff. 95% |
|---|---|---|---|---|
| Sweetness Acceptability | 5P | 2.84 | 3.11 | NSD |
| Sweetness Onset | 7I | 4.29 | 4.38 | NSD |
| Sweetness Intensity | 7I | 4.46 | 4.48 | NSD |
| Aftertaste Intensity | 7I | 4.59 | 4.46 | NSD |
| Bitterness | 7I | 4.07 | 3.84 | NSD |
| Sweetness Duration | 7I | 4.73 | 4.36 | yes |
| Pleasantness of Aftertaste | 7I | 3.95 | 4.21 | NSD |
| Overall Liking | 9H | 4.84 | 5.73 | yes |
| Artificial/ Natural | 100P | 38.33 | 52.05 | yes |

Scale Note. 5P: 5 point line scale; 0=poor, 3=good, 5=excellent. 7I: 7 point line scale; 0=dislike, 4=just right, 7=excellent. 9H: 9 point line scale; 0=dislike, 5 just right, 9=like extremely. 100P: 100 point unstructured line scale; 0=artificial, 100=natural. NSD: no significant differences. These scales were chosen to give the most accurate assessment of potential differences for each attribute tested.

To a significant degree, the DHB-containing sample demonstrated reduced sweetness duration, more natural taste and greater overall "liking."

Example 3

Baked Apple Bar with SPLENDA®/DHB

Recipe Using SPLENDA®
2 cups all purpose flour; 2 teaspoons baking powder; 1 teaspoon baking soda; 2 teaspoons ground cinnamon; 1 cup reduced-calorie margarine; ½ cup egg substitute; 2 teaspoons vanilla extract; ½ cup unsweetened applesauce; 2 cups peeled and grated apples; and 50 g SPLENDA®.

Recipe Using SPLENDA® With DHB
2 cups all purpose flour; 2 teaspoons baking powder; 1 teaspoon baking soda; 2 teaspoons ground cinnamon; 1 cup reduced-calorie margarine; ½ cup egg substitute; 2 teaspoons vanilla extract; ½ cup unsweetened applesauce; 2 cups peeled and grated apples; 50 g SPLENDA®; and 0.13 g DHB sodium salt.

The apple bars were prepared according to the following procedures.
1. Preheat oven to 350° F. Spray two 8x8x2" metal baking pans with vegetable cooking spray. In a small bowl, stir together flour, baking powder, baking soda, and cinnamon. Set aside.
2. In a large mixing bowl with mixer at high speed, beat margarine, about 1 minute. Add egg substitute and vanilla and blend at high speed for 30 seconds.
3. Add SPLENDA® low-calorie sweetener (and DHB when applicable), and beat at medium speed until smooth (~90 seconds). Add apple sauce, grated apple, and flour mixture, and beat at low speed until mixed (~45 seconds).
4. Spread batter in pan and bake for 40 minutes, or until a wooden pick inserted in the center comes out clean. Cool to room temperature and cut into bars.

The SPLENDA®-sweetened apple bars were evaluated in comparison to the samples containing SPLENDA® with DHB. 66 panelists received a serving of each product, and marked their responses on a questionnaire. Data were analyzed using Analysis of Variance and Tukey's HSD tests. Mean scores are shown in Table 4.

TABLE 4

| | Scale | SPLENDA ® Ctrl. | SPLENDA ® w/DHB | Signif. Diff. 95% |
|---|---|---|---|---|
| Sweetness Acceptability | 5P | 2.92 | 3.31 | yes |
| Sweetness Onset | 7I | 3.45 | 3.86 | yes |
| Sweetness Intensity | 7I | 3.69 | 4.11 | yes |
| Naturally Sweet Taste | 100P | 53.1 | 65.5 | yes |
| Aftertaste Intensity | 7I | 4.05 | 4.23 | NSD |
| Bitterness | 7I | 4.2 | 3.97 | NSD |
| Sweetness Duration | 7I | 4.17 | 4.36 | NSD |
| Pleasantness of Aftertaste | 7I | 4.08 | 4.58 | yes |
| Overall Liking | 9H | 5.58 | 6.53 | yes |

Scale Note. 5P: 5 point line scale; 0=poor, 3=good, 5=excellent. 7I: 7 point line scale; 0=dislike, 4=just right, 7=excellent. 9H: 9 point line scale; 0=dislike, 5 just right, 9=like extremely. 100: 100 point; 0 =artificial, 100=natural. NSD: no significant differences.

The DHB-added sample was perceived as having a significantly faster sweetness onset than that of the control sample. The sample with DHB was significantly better for initial sweetness perception, sweetness intensity, natural sweet taste, aftertaste pleasantness and overall liking. However, no significant differences were noted for bitterness, aftertaste intensity, and duration of aftertaste.

Example 4

Evaluation of DHB in Sucralose-Sweetened Colas

A. Background

Sensory research was conducted to determine the effect of DHB on sucralose-sweetened cola (220 ppm). The levels of DHB tested were 12.5, 15 and 17.5 ppm.

B. Sensory Testing

Each product was evaluated twice by approximately 28 panelists. Products were evaluated using a computerized sensory data acquisition system. Panelists were seated in individual, partitioned sensory booths to minimize their interaction with each other. Samples were presented one at a time. Each sample was evaluated before the next sample was tasted. Sample presentation order was randomized. Panelists consumed two ounces of refrigerated cola. After completing the evaluation of each sample, panelists were instructed to rinse their mouth thoroughly with a bite of cracker and some bottled water.

| Evaluated Attributes | |
|---|---|
| Attribute | Scale |
| Overall Liking | 1 = Dislike; 9 = Like |
| Sweetness Amount | 1 = Lack; 7 = Abundance |
| Sweetness Quality | 1 = Poor; 5 = Excellent |
| Rate of Sweetness Onset | 1 = Slow; 7 = Rapid |
| Cola Flavor Intensity | 0 = None; 100 = Extreme |

-continued

Evaluated Attributes

| Attribute | Scale |
|---|---|
| Liking for Cola Flavor | 1 = Dislike; 9 = Like |
| Bitterness Intensity | 1 = None; 5 = Extreme |
| Diet/Regular Taste | 0 = Diet; 100 = Regular |
| Duration of Sweet Aftertaste | 1 = Short; 9 = Long |
| Duration of Cola Flavor Aftertaste | 1 = Short; 9 = Long |
| Duration of Other Aftertaste | 1 = Short; 9 = Long |
| Pleasantness of Aftertaste | 1 = Unpleasant; 7 = Pleasant |

C. Results

The products were significantly different for only one attribute. The duration of sweet aftertaste was significantly lower for the cola with 17.5 ppm DHB (sample 4) when compared to the cola with 12.5 ppm of DHB (sample 2). There were no significant differences among products for any of the other attributes. Quantitative data were analyzed using Analysis of Variance and Tukey's HSD Test. The data are shown in Table 5.

TABLE 5

Sensory Results
(N = 55) (28 panelists; 2 replicates)

| Attribute | Sucral. 220 ppm (1) | Sucral. 220 ppm + 12.5 ppm DHB (2) | Sucral. 220 ppm + 15 ppm DHB (3) | Sucral. 220 ppm + 17.5 ppm DHB (4) | Signif. Diff. at 95% |
|---|---|---|---|---|---|
| Liking for Overall Product | 5.60 | 5.78 | 5.67 | 5.84 | NSD |
| Amount of Sweetness | 3.98 | 4.18 | 4.00 | 3.93 | NSD |
| Sweetness Quality | 2.49 | 2.73 | 2.78 | 2.73 | NSD |
| Rate Of Sweetness Onset | 3.75 | 4.00 | 3.93 | 3.85 | NSD |
| Cola Flavor Intensity | 49.21 | 49.73 | 49.0 | 47.76 | NSD |
| Liking for Cola Flavor | 5.56 | 5.80 | 5.78 | 5.62 | NSD |
| Bitterness Intensity | 1.89 | 1.98 | 1.95 | 1.95 | NSD |
| Diet/Regular Taste | 36.30 | 41 | 46.06 | 42.55 | NSD |
| Duration of Sweet Aftertaste | 4.22 | 4.38 | 4.05 | 3.93 | Yes (2 vs 4) |
| Duration of Cola Flavor Aftertaste | 3.64 | 3.87 | 3.80 | 3.78 | NSD |
| Duration of Other Aftertaste | 4.44 | 4.45 | 4.36 | 4.31 | NSD |
| Pleasantness of Aftertaste | 4.00 | 4.13 | 4.25 | 4.27 | NSD |

Example 5

Generic Cola Sweetened with Sucralose at 220 ppm

A. Product Formula

| Ingredients | Syrup Batch Formula |
|---|---|
| water | 3074.6 g |
| cola concentrate | 39.0 g |
| SPLENDA ® brand sweetener, 25% liquid concentrate | 16.6 g |
| phosphoric acid, 75% | 10.8 g |
| potassium benzoate | 5.0 g |
| citric acid, anhydrous | 2.0 g |
| caffeine, anhydrous | 2.0 g |
| Total | 3150.0 g |

B. Preparation Procedure (i) syrup

Add ingredients to water in the following order: potassium benzoate, SPLENDA®, phosphoric acid, citric acid, caffeine and cola concentrate. Mix thoroughly between additions.

(ii) finished beverage

Mix syrup and carbonated water (one part syrup to five parts carbonated water) and bottle ($CO_2$ level of finished beverage=3.6 volumes). The syrup batch makes 5 gallons of finished beverage.

What is claimed is:

1. A method of improving the sweetness delivery profile of a sucralose-containing ingestible composition comprising the step of incorporating into said composition a compound that reduces the length of time during which sucralose sweetness is perceived, wherein said compound is DHB at a DHB:sucralose weight ratio of from about 0.01% to about 100%.

2. The method of claim 1, wherein the DHB:sucralose weight ratio is from about 0.1% to about 50%.

3. The method of claim 2, wherein the DHB:sucralose weight ratio is from about 2% to about 10%.

4. The method of claim 1, wherein the ingestible composition is a sweetener.

5. The method of claim 4, wherein the sweetener consists essentially of sucralose.

6. The method of claim 5, wherein the sweetener is sucralose and a carrier.

7. The method of claim 1, wherein the ingestible composition is a solid or semi-solid food product.

8. The method of claim 1, wherein the ingestible composition is a beverage.

9. The method of claim 1, wherein the ingestible composition is a pharmaceutical composition.

* * * * *